(12) United States Patent
Ghiotti

(10) Patent No.: US 6,862,841 B2
(45) Date of Patent: Mar. 8, 2005

(54) BOUQUET HOLDER

(76) Inventor: Lisa Ghiotti, 757 Logan Ave., Bronx, NY (US) 10465

( * ) Notice: Subject to any disclaimer, the term of this patent is extended or adjusted under 35 U.S.C. 154(b) by 9 days.

(21) Appl. No.: 10/335,699

(22) Filed: Jan. 2, 2003

(65) Prior Publication Data

US 2003/0136049 A1 Jul. 24, 2003

Related U.S. Application Data

(60) Provisional application No. 60/349,808, filed on Jan. 22, 2002.

(51) Int. Cl.[7] .............................................. A47G 7/02
(52) U.S. Cl. ..................................................... 47/41.12
(58) Field of Search ............................ 47/41.01, 41.12, 47/41.15; 24/598.2, 598.3; 206/423

(56) References Cited

U.S. PATENT DOCUMENTS

| | | | | |
|---|---|---|---|---|
| 267,112 A | * | 11/1882 | Sanderson | 292/86 |
| 1,209,083 A | * | 12/1916 | Wagner, Jr. | 119/866 |
| 1,637,699 A | * | 8/1927 | Lauterbach | 59/89 |
| 2,486,848 A | * | 11/1949 | Huck | 24/6 |
| 2,563,202 A | * | 8/1951 | Wurzlow | 47/41.01 |
| 2,843,899 A | * | 7/1958 | Homand | 24/5 |
| 4,204,365 A | * | 5/1980 | Hirvi | 47/41.01 |
| 5,070,644 A | * | 12/1991 | Hasty | 47/41.12 |
| 5,454,189 A | * | 10/1995 | Graham et al. | 47/41.12 |
| 5,787,638 A | * | 8/1998 | Harshman | 47/41.12 |
| 6,012,250 A | * | 1/2000 | Ray | 47/41.01 |
| 6,289,631 B1 | * | 9/2001 | Harshman et al. | 47/41.12 |
| 6,393,762 B1 | | 5/2002 | Harshman et al. | |
| D463,322 S | | 9/2002 | Lo Vullo et al. | |
| 2003/0136049 A1 | * | 7/2003 | Ghiotti | 47/41.01 |

FOREIGN PATENT DOCUMENTS

| | | | | | |
|---|---|---|---|---|---|
| GB | 2315213 A | * | 1/1998 | | A01G/5/04 |
| JP | 08322694 A | * | 12/1996 | | A47G/7/02 |
| JP | 09191990 A | * | 7/1997 | | A47G/7/02 |

* cited by examiner

Primary Examiner—Jeffrey L. Gellner
(74) Attorney, Agent, or Firm—Kenyon & Kenyon

(57) ABSTRACT

A hand-held floral bouquet holder is presented. The hand-held floral bouquet holder comprises a handle, a collar, a body connected to the handle and the collar, the body configured to define a volume, a removable material positioned in the volume, a cage arranged such that an edge of the cage contacts the collar; and a cage locking arrangement configured to lock the cage to the collar.

15 Claims, 2 Drawing Sheets

BOUQUET HOLDER

The present non-provisional application claims priority from provisional application No. 60/349,808 filed Jan. 22, 2002.

FIELD OF THE INVENTION

The present invention relates to hand-held floral bouquet arrangements. More specifically, the present invention provides a decorative, sturdy, reusable floral bouquet holder typically used in weddings or similar events.

BACKGROUND INFORMATION

Formal occasions, such as weddings, often involve participants holding floral or decorative arrangements to provide a festive atmosphere for all present. Weddings, in particular, are life changing events which are planned for long periods of time, where even the smallest items are carefully detailed. Significant planning, in the case of bridal accessories, occurs prior to the wedding to ensure that the wedding exhibits the personal tastes of the bride. Often, the bride and/or others in the bridal party carry a ceremonial bouquet of flowers which is thrown at the conclusion of festivities. The bouquet may be thrown to onlookers.

Currently, hand-held bouquets of flowers used at weddings may have several configurations. These bouquet configurations, however, often have many problems. One bouquet arrangement commonly used is a set of equal length cut flowers. This type of arrangement, however, has several obvious drawbacks. The cut ends of the stems usually results in water loss causing premature wilting of the blossoms. Additionally, the leaking water and/or sap may potentially soil the hands and/or dress of the bride or bridal attendees. Lastly, the bouquet may be difficult to hold because the stems are not bound.

To alleviate these drawbacks, florists often provide a binding around the exterior of the stems of the flowers. Such binding of the flowers allows for ease of handling. To bunch the flowers, wire or a similar type binder is used to draw the stems together. An external wrapping is then applied usually consisting of several layers of simple fabric, such as linen. The florist may also add a wetting device such that the stem cut ends do not dry out. This wetting device is usually a plastic bodied water retaining end cap. To create these arrangements the flowers must be tightly bound to allow the bride to be able to hold the flowers in a unified configuration. The wire binding process may damage the stems causing an additional water leakage path for the flowers enhancing the wilting process. The binding also only allows a limited tubular shape for the floral bouquet. A further drawback of these arrangements is that some species of delicate flowers may be wholly inappropriate for binding in this fashion, limiting the floral choices available for use. The bouquet prepared in this manner, therefore, limits the types and arrangements of flowers that may be carried by the bride or bridal party on wedding day.

Another alternative bouquet arrangement for brides is a plastic bouquet holder. The plastic bouquet holder provides a binding point for cut flowers by using a friction-fit plastic handle configuration. These plastic holders, while functional, are often unattractive to the eye. They are used, however, because they are a superior alternative to other arrangements. The plastic bouquet holders are easier to hold with less possibility of soiling the user. The flowers are often kept in place by either force fitting the stems into the holder or are held in place by a floral foam body which allows the cut flower ends to remain moist.

There are many drawbacks to the typical plastic bouquet holder. Plastic bouquet holders are single use-throw away items not suitable for providing a keepsake of the occasion. If substantial changes are desired in the arrangement, such as when a bride or florist wishes to change or enhance a previously made bouquet, the entire floral holder and the flower holding foam head must be thrown away, as the head and the handle are crafted as a single unit. If multiple bouquets are to be used throughout the day, such as during the wedding and at the reception, multiple holders must be used due to the one piece construction, thereby increasing costs for the occasion.

It is therefore desired to provide a floral bouquet holder which does not have the drawbacks typically present in fresh cut flower arrangements and hand-held plastic bouquet arrangements.

SUMMARY

It is therefore an object of the present invention to provide a hand-held floral bouquet holder suitable as a commemorative heirloom of a special event such as a wedding.

It is also an object of the present invention to provide a hand-held floral bouquet holder which may be easily manipulated to allow changes in the bouquet arrangement without extensive waste.

It is also an object of the present invention to provide a hand-held floral bouquet holder which will not present the bearer with soiling problems from the cut flowers.

It is also an object of the present invention to provide a binding arrangement for flowers which will be suitable for differing flower types, wherein the arrangement will not harm the flower stems.

It is also an object of the present invention to provide a binding arrangement for flowers which will provide the cut ends with a water source to maintain bouquet freshness.

These and other objects, which will become apparent from the following detailed description, are achieved as described. The invention provides a wedding history bridal bouquet holder. The holder comprises a handle, a collar, a body connected to the handle and the collar, the body configured to define a volume, a removable material positioned in the volume, a cage arranged such that an edge of the cage contacts the collar and a cage locking arrangement configured to lock the cage to the body, the cage locking arrangement configured as a plurality of removable clasps.

The invention also provides another embodiment of the invention. This embodiment provides a hand-held floral bouquet holder comprising a handle, a collar, a body connected to the handle and the collar, the body configured to define a volume. This embodiment further provides a removable material positioned in the volume a cage arranged such that an edge of the cage contacts the collar, and a cage locking arrangement configured to lock the cage to the collar.

DETAILED DESCRIPTION

Figure 1:
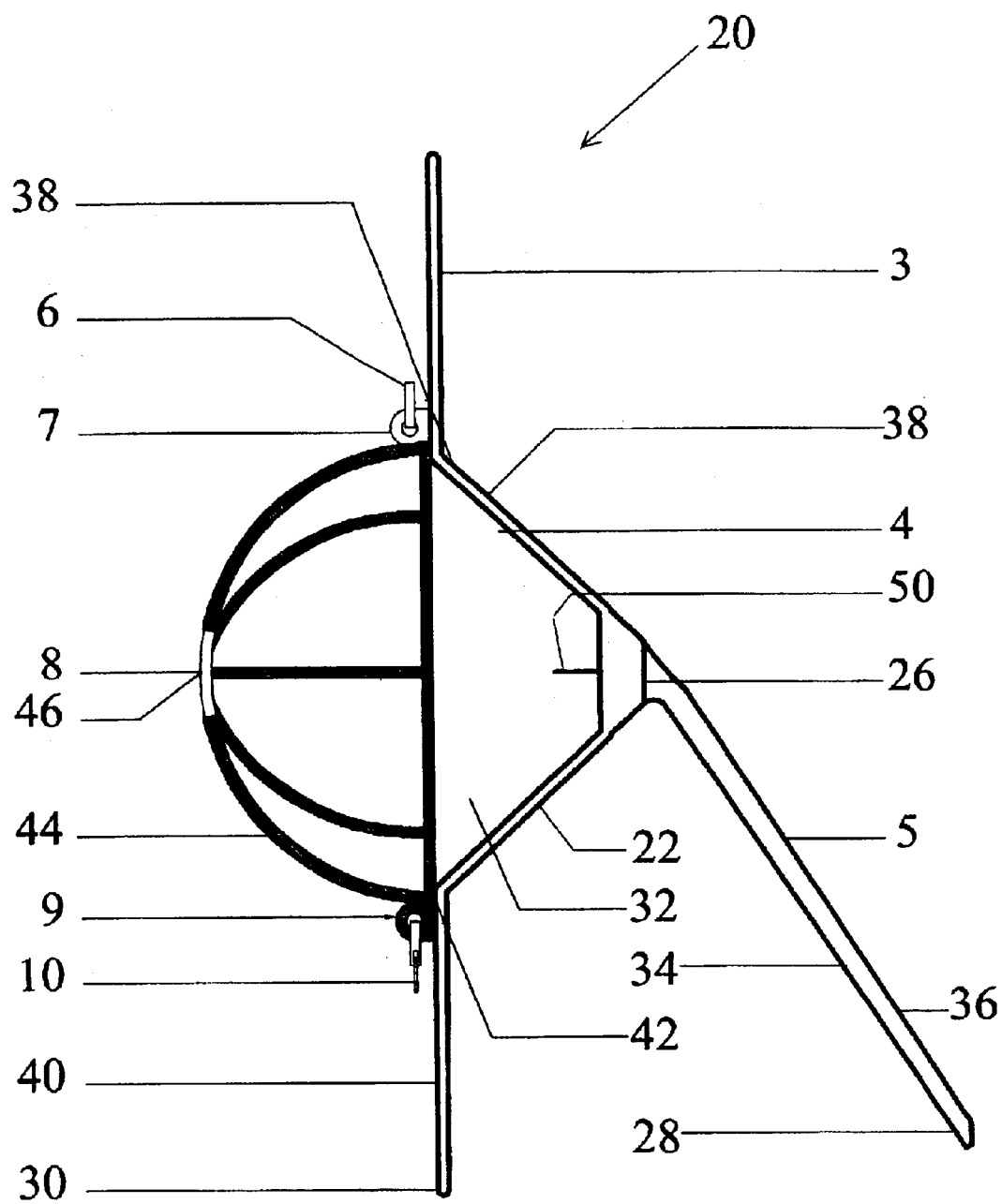
FIG. 1 is a sectional view of a wedding history bridal bouquet holder in conformance with the present invention.
Figure 2:
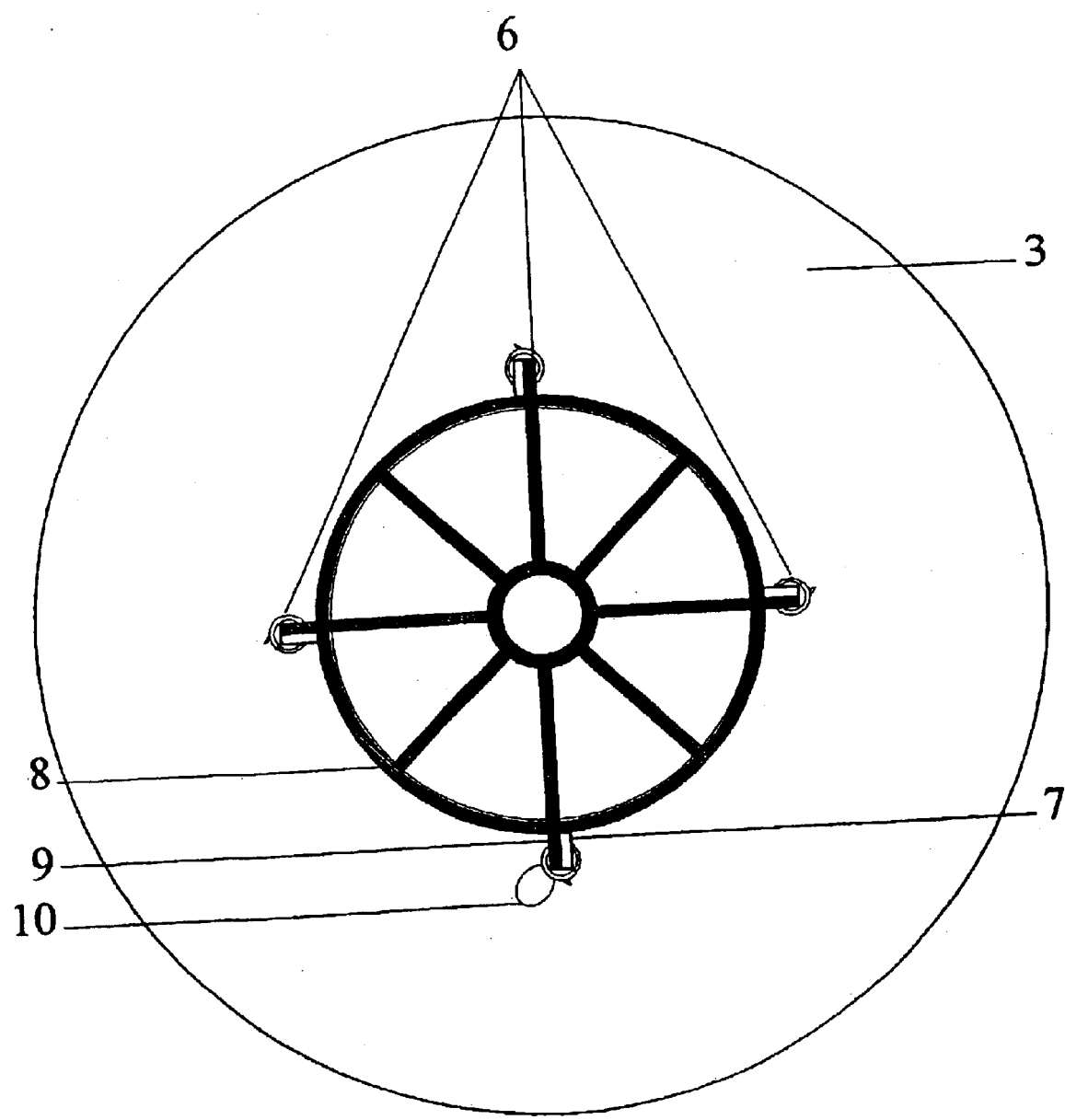
FIG. 2 is a plan view of a foam guard cage with clasps of FIG. 1.

Referring to FIGS. 1 and 2, a holder 20 in conformance with the present invention is shown. The holder 20 comprises a handle 5 connected to a body 22 through a connection 26. The holder 20 may be configured of a material, such as metal, which allows the holder 20 to be sturdy for holding flowers and/or decorative arrangements as well as throwing of the holder 20 with the arrangement. Metal materials, if used, may be chosen to provide a fanciful or attractive eye-catching presentation. Typical materials may include gold, silver, aluminum, stainless steel, pewter or platinum. The material may be chosen such that the holder 20 may be used successive times and passed down as a family heirloom. When used in this type of embodiment, corrosion resistant materials may be used to provide an attractive appearance over many years. The holder 20 may also be configured of a composite of materials such as a structured core surrounded by a decorative top coat or surface.

A handle 5 allows a bearer to hold the holder 20. The handle 5 may be shaped in a number of configurations, the configuration in FIG. 1 being only one possibility for the invention, and as such the configuration shown should not be considered limiting. The handle 5 maybe shaped as a flat bar, a rounded bar or other geometric configuration to allow holding of the holder 20. The handle 5 may also be configured with finger grips 34 to allow the bearer to hold the holder 20 with comfort. An exterior 36 of the handle 5 may be configured with a slip resistant surface to allow proper gripping limiting slip. Such configurations include, but are not limited to, grooves, formed indentations or protrusions on the exterior 36 to allow superior frictional contact during holding.

The handle 5 is configured with an end 28. The end 28 may be any geometric form, including a blunt end configuration to limit or eliminate any sharp edge which may damage a potential catcher of the holder 20 if the holder 20 is thrown as part of the festivities.

A connection 26 connects the handle 5 to the body 22. The connection 26 may allow the handle 5 to be positioned at a desired angle relative to the body 22 or alternatively the connection 26 may be a fixed/non-movable connection. The connection 26 may be a friction type connection, a ball and socket connection, or other arrangement to allow the relative positioning to occur. The connection 26 may be configured to allow water retention inside the body 22 of the holder 20. The connection 26 may also be configured to allow the handle 5 to be quickly disconnected allowing differing "mix and match" ornamental designs between differing handles and bodies. The connection 26 may also be positioned external to the body 22 to allow the body 22 to be water tight independent from the connection 26.

A body 22 connects to the connection 28 and defines a volume 32. Similar to the handle 5, the body 22 may be made of any material to allow for sturdy and continued use of the holder 20. In the configuration shown in FIG. 1, the holder 20 is configured as an open topped cone, however other geometries are possible. The body 22 may be configured with a surface 38 which allows engraving to be ornamentally applied. Such a surface 38 may be a flat surface or a round surface according to the wishes of the bearer. In the case of a non-movable handle 5, the holder 20 may be configured as a one piece arrangement during the initial forming and/or fabrication of the holder 20 as shown in FIG. 1.

A collar 3 may be attached to the body 22 of the holder 20. The collar 3 may be constructed of similar materials to the body 22. The collar 3/body 22 attachment may be done during the initial forming or construction of the holder 20 as a one piece design or alternatively a multi-piece design. The collar 3 has end 30 which maybe formed as a blunt end or other configuration and may prevent a sharp edge limiting potential damage if the holder 20 is thrown. An exterior surface 40 on the collar 3 may be used to provide an engraving surface for ornamental decoration. Although shown as a flat collar 3, the collar 3 may be attached at an angle or may be shaped with a different cross-section to provide differing eye-appealing configurations. The collar 3 and/or holder 20 may be also configured with differing ornamentation such as jewels, pictures or other types of materials to add to the festive appearance of the holder 20. The end 30 may be shaped to provide a scalloped edge or differing configuration to enhance eye appeal of the holder 20.

A collar loop 7 may be formed on the collar 3 or the body 22 to provide a connection point for objects to the collar 3. The collar loop 7 may be configured such that an attachment 68 between the collar loop 7 is flush with the exterior surface 40 of the collar 3. The loop 7 may be made of a material which is similar to the collar 3 to provide a seamless appearance or a differing material to provide a contrasting appearance. The loop 7 and the attachment 68 may be configured to provide a resistance to shear and bending forces which may be imparted to the loop 7 upon a throwing and/or impact of the holder 20. Differing numbers of loops 7 may be configured on the holder 20. Although shown as loops 7, other geometric shapes, such as tabs, for example, may be used.

The loops 7 provide an attachment point for a cage 8 through clasps 6. The clasps 6 may be designed as both a structural and an ornamental feature of the holder 20 and transfer forces from the cage 8 through to the loops 7. The cage 8 provides for a retention of a material 4 in the volume 32 of the holder 20. The cage 8 may be constructed of a material to protect the interior volume 32. In an example embodiment, the cage 8 may be constructed of foam to provide for a retention and support of flowers while guarding against unnecessary potential hard impact in the case of a thrown holder 20. In the example embodiment shown, the cage 8 may be configured with a hemispherical head with a cage edge 42 which may contact the exterior surface 40. The cage 8 may be configured to be removable as a single piece or in combination with the material 4. The cage 8 may be made using any production methodology. Additionally, the cage tendons 44 may be positioned in equal radial arcs emanating from a center point 46 as shown, or may be configured in a different geometry. The cage 8 may be attached to the collar loop 7 through matching loops 9 on the cage 8 through which clasps 6 may be fastened. The clasps 6 may be ornamental in nature protruding to the outside of a floral arrangement, or may also be covered by the floral bouquet by positioning of flowers in the material 4. The clasps 6 may be designed to be a rugged type connection which will only be detached with significant force by an individual to ensure that the cage 8 does not become detached prematurely or in an unintended manner.

A detachable jewelry clasp 10 provides a clasp connection similar to that of the detachable clasps 6, with the added feature of providing an identifiable symbol or ornamentation on the holder 20. The clasp 10 provides, for instance, a trademark or similar mark to be applied to the holder 20. The clasps 6, and 10 may be detachable for use separately as ornamentation for a bracelet or necklace for example. Differing amounts of clasps 6 and jewelry clasps 10 may be used for the holder 20.

A material 4 may be placed in the volume 32. The material 4 provides for a connection between the floral bouquet and the holder 20. The material 4 may provide a solution, such as water, to the ends of cut flowers allowing the flowers to absorb moisture from the material 4. The material 4 may be formed in any type of geometry allowing flowers to be placed in differing configurations allowing the florist flexibility in providing a desired design. The material 4 may allow for minimal damage to the flowers, thereby allowing greater flexibility in the types of flowers used in bouquets. The material 4 may be chosen such that the color of the material 4 provides a harmonious design with the flowers and the holder 20. The material 4 may be glued to the holder 20 or placed over a protrusion in the holder 20 to allow a friction fit of the material 4. The material 4 may be configured such that it may easily be replaced for successive uses. The material 4 may be, for example, a typical floral foam or other appropriate material.

Operationally, the material 4, which retains a water solution, is inserted in the volume 32 of the holder 20. The cage 8, attached to the material 4 is positioned such that the loops 9 and the collar loop 7 provide a continuous hole through the combined loop 9 and collar loop 7 arrangement. The cage 8 is then secured to the collar 3 through three clasps 6 and one detachable jewelry clasp 10. Flowers may be inserted into the material 4 in differing patterns, types and arrangements according to the wishes of the bearer. Upon insertion of the flowers into the material 4, the cage 8 may be used to provide lateral support for the flower allowing for differing packing density and configurations of a finalized floral arrangement. As will be apparent to those skilled in the art, differing items may be inserted into the material 4 and as such the invention is not limited to the placement of flowers into the holder 28. Other items such as stick pins or differing ornamentation may be used in lieu of flowers or in addition to flowers to create differing presentations. After the event, the material 4 with the flowers may be removed and presented to an individual while the holder 20 may be retained as an heirloom and/or memorabilia of the event. The holder 20 may be reused by simply repeating the above steps to produce another bouquet.

The configuration described provides several advantages to existing designs which have been present in the floral industry for many years. The present configuration prevents the bearer from becoming soiled either on the hands or clothing from the cut ends of the flowers. The material 4 allows the cut flowers to maintain freshness while providing a sufficient non-damaging holding capability. The configuration severely limits the amount of waste present in current designs by allowing the reuse of the holder many times. The described configuration also allows the bearer to hold a plurality of flowers in a convenient way. The present invention also provides the bearer with a memorable keepsake which may be passed down as a family heirloom.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A hand-held floral bouquet holder comprising:
   a handle;
   a collar with an engraving surface;
   a body connected to the handle and the collar, the body configured to define a volume;
   a removable material positioned in the volume;
   a cage arranged such that an edge of the cage contacts the collar;
   at least two collar loops configured on the collar; and
   a cage locking arrangement configured to lock the cage to the collar, the cage locking arrangement configured as a plurality of removable jewelry clasps through the collar loops, wherein the collar is substantially parallel to a bottom of the cage.

2. The hand-held floral bouquet holder according to claim 1, wherein the handle and the body are made of metal.

3. The hand-held floral bouquet holder according to claim 1, wherein the metal is at least one of gold, silver, stainless steel, aluminum, pewter and platinum.

4. The hand-held floral bouquet holder according to claim 1, wherein the jewelry clasp is configured to be detached from the cage.

5. The hand-held floral bouquet holder according to claim 1, wherein the material is floral flower foam.

6. The hand-held floral bouquet holder according to claim 1, wherein the cage is hemispherical in configuration, wherein a non-round edge of the hemispherical configuration contacts the collar.

7. The hand-held floral bouquet holder according to claim 1, wherein the removable material and the cage are a single arrangement.

8. The hand-held floral bouquet holder according to claim 1, wherein the body is configured with a flat surface configured to receive engravements.

9. The hand-held floral bouquet holder according to claim 1, wherein the handle is connected to the body at a connection, the connection configured to adjust the handle relative to the body.

10. The hand-held floral bouquet holder according to claim 1, wherein the handle has an end which is blunt.

11. The hand-held floral bouquet holder according to claim 1, wherein the body has an exterior end which is blunt.

12. The hand-held floral bouquet holder according to claim 1, wherein the handle is configured with finger-grips.

13. The hand-held floral bouquet holder according to claim 1, wherein the handle is configured with a slip resistant exterior surface.

14. The hand-held floral bouquet holder according to claim 1, wherein the handle is configured to be removed from the body.

15. A hand-held floral bouquet holder comprising:
    a handle;
    a collar with an engraving surface;
    a body connected to the handle and the collar, the body configured to define a volume;
    a removable material positioned in the volume;
    a cage arranged such that an edge of the cage contacts the collar;
    at least two collar loops configured on the collar;
    a cage locking arrangement configured to lock the cage to the collar and wherein the cage locking arrangement is a plurality of removable jewelry clasps through the collar loops, wherein the collar is substantially parallel to a bottom of the cage.

* * * * *